(12) United States Patent
Franklin et al.

(10) Patent No.: US 11,264,920 B2
(45) Date of Patent: Mar. 1, 2022

(54) ENERGY GENERATION SYSTEM AND METHOD

(71) Applicant: KONINKLIJKE PHILIPS N.V., Eindhoven (NL)

(72) Inventors: Steven Ernest Franklin, Eindhoven (NL); Lutz Christian Gerhardt, Eindhoven (NL); Willem Potze, Geldrop (NL); Hans Kroes, Olst (NL); Mark Thomas Johnson, Arendonk (BE)

(73) Assignee: Koninklijke Philips N.V., Eindhoven (NL)

( * ) Notice: Subject to any disclaimer, the term of this patent is extended or adjusted under 35 U.S.C. 154(b) by 72 days.

(21) Appl. No.: 16/902,389

(22) Filed: Jun. 16, 2020

(65) Prior Publication Data

US 2020/0358372 A1    Nov. 12, 2020

Related U.S. Application Data

(63) Continuation of application No. 15/561,812, filed as application No. PCT/EP2016/057029 on Mar. 31, 2016, now Pat. No. 10,873,274.

(30) Foreign Application Priority Data

Mar. 31, 2015    (EP) ..................................... 15161937

(51) Int. Cl.
*H02N 1/04*    (2006.01)
*F03B 3/12*    (2006.01)
*F03B 13/10*    (2006.01)

(52) U.S. Cl.
CPC .............. *H02N 1/04* (2013.01); *F03B 3/126* (2013.01); *F03B 13/10* (2013.01)

(58) Field of Classification Search
CPC ............ F03B 13/10; F03B 3/126; H02N 1/04
See application file for complete search history.

(56) References Cited

U.S. PATENT DOCUMENTS 3,086,131 A    4/1963    Ballentine
3,201,620 A    8/1965    Ballentine
(Continued)

FOREIGN PATENT DOCUMENTS

CN    103795288 A    5/2014
CN    203933440 U    11/2014
(Continued)

OTHER PUBLICATIONS

Lin et al "Noncontact Free-Rotating Disk Triboelectric Nanogenerator as a Sustailable Energy Harvester and Self-Powered Mechanical Sensor" Applied Materials and Interfaces, Feb. 26, 2014 vol. 6, No. 4 p. 3031-3038.
(Continued)

*Primary Examiner* — Thienvu V Tran
*Assistant Examiner* — Bart Iliya

(57)    ABSTRACT

The invention provides an energy generation system comprising a generator having charged mutually rotating plate elements, and comprising an integrated drive mechanism for precisely controlling a separation distance between the plates. The drive mechanism provides a separation which varies as a function of the speed of rotation, hence assimilating separation control within the natural operation of the device. Embodiments provide plates comprising self-generating bearings, both hydrodynamic gas and fluid bearings and centrifugal regulator solid bearings, the bearings providing a supporting force between the plates of a magnitude which increases as the rotational speed of the plates increases. Methods of energy generation are also provided.

20 Claims, 7 Drawing Sheets

(56) References Cited

U.S. PATENT DOCUMENTS

| | | | |
|---|---|---|---|
| 4,990,813 A | 2/1991 | Paramo | |
| 2002/0047492 A1* | 4/2002 | Jones | H02N 1/08 310/309 |
| 2009/0206602 A1 | 8/2009 | Nakamura | |
| 2013/0049531 A1 | 2/2013 | Wang et al. | |
| 2014/0084748 A1 | 3/2014 | Wang et al. | |
| 2014/0246950 A1 | 9/2014 | Wang et al. | |
| 2014/0338458 A1 | 11/2014 | Wang et al. | |
| 2015/0035408 A1 | 2/2015 | Despesse | |
| 2015/0061464 A1 | 3/2015 | Park | |
| 2018/0026552 A1* | 1/2018 | Nagata | H02N 1/08 310/309 |
| 2018/0198385 A1* | 7/2018 | Vincent | H02K 35/00 |

FOREIGN PATENT DOCUMENTS

| | | |
|---|---|---|
| LV | 11928 | 12/1997 |
| WO | 2007094113 A1 | 8/2007 |
| WO | 2013151590 A2 | 10/2013 |

OTHER PUBLICATIONS

Zhang et al "High Performance Triboelectric Nanogenerators Based on Large-Scale Mass-Fabrication Technologies" Science Direct Nano Energy (2015)11, p. 304-322.

Boland "Micro Electric Power Generators" Thesis by Justin Boland in Partial Fulfilment of the Requirements for the Degree of Doctor of Philosophy 180 Pages.

* cited by examiner

ENERGY GENERATION SYSTEM AND METHOD

CROSS-REFERENCE TO RELATED APPLICATIONS

This application is the continuation application under 37 C.F.R. § 1.53(b) of U.S. patent application Ser. No. 15/561,812 filed on Sep. 26, 2017. U.S. patent application Ser. No. 15/561,812 is a U.S. National Phase application under 35 U.S.C. § 371 of International Application No. PCT/EP2016/057029, filed on Mar. 31, 2016, which claims the benefit of EP Application No. 15161937.6 filed on Mar. 31, 2015. Priority under 35 U.S.C. § 120 is claimed from U.S. patent application Ser. No. 15/561,812, which claims benefit of priority from U.S. National Phase application under 35 U.S.C. § 371 of International Application No. PCT/EP2016/057029, which claims the benefit of EP Application No. 15161937.6. The entire disclosures of U.S. patent application Ser. No. 15/561,812, International Application No. PCT/EP2016/057029, and EP Application No. 15161937.6 are specifically incorporated herein by reference.

FIELD OF THE INVENTION

This invention relates to an electrical energy generator for converting mechanical energy into electrical energy and methods of energy generation.

BACKGROUND OF THE INVENTION

One example of such a system, whereby mechanical energy may be converted into electrical energy, is a triboelectric energy generation system. The triboelectric effect (also known as triboelectric charging) is a contact-induced electrification in which a material becomes electrically charged after it is contacted with a different material through friction. Triboelectric generation is based on converting mechanical energy into electrical energy through methods which couple the triboelectric effect with electrostatic induction. It has been proposed to make use of triboelectric generation to power mobile wearable devices such as sensors and smartphones by capturing the otherwise wasted mechanical energy from such sources as walking, random body motions, the wind blowing, vibration or ocean waves. See, for example: Wang, Sihong, Long Lin, and Zhong Lin Wang. "Triboelectric nanogenerators as self-powered active sensors." Nano Energy 11 (2015): 436-462).

The triboelectric effect is based on a series that ranks various materials according to their tendency to gain electrons (become negatively charged) or lose electrons (become positively charged). This series is for example disclosed in A. F. Diaz and R. M. Felix-Navarro, A semi-quantitative tribo-electric series for polymeric materials: the influence of chemical structure and properties, Journal of Electrostatics 62 (2004) 277-290. The best combinations of materials to create static electricity are one from the positive charge list and one from the negative charge list (e.g. PolyTetraFluoroEthylene (PTFE) against copper, or fluorinated ethylene propylene (FEP) against aluminium). Rubbing glass with fur, or a comb through the hair are well-known examples from everyday life of triboelectricity.

In its simplest form, a triboelectric generator thus uses two sheets of dissimilar materials, one an electron donor, the other an electron acceptor. One or more of the materials can be an insulator. Other possible materials might include semiconductor materials, for example silicon comprising a native oxide layer. When the materials are brought into contact, electrons are exchanged from one material to the other. This is simply the triboelectric effect. If the sheets are then separated, each sheet holds an electrical charge (of differing polarity), isolated by the gap between them, and an electric potential is built up. If an electrical load is connected between electrodes deposited/placed at the backside of the two material surfaces, any further displacement of the sheets, either laterally or perpendicularly, will induce in response a current flow between the two electrodes. This is simply an example of electrostatic induction. As the distance between the respective charge centres of the two plates is increased, so the attractive electric field between the two, across the gap, weakens, resulting in an increased potential difference between the two outer electrodes, as electrical attraction of charge via the load begins to overcome the electrostatic attractive force across the gap.

In this way, triboelectric generators convert mechanical energy into electrical energy through a coupling between two main physical mechanisms: contact electrification (tribo-charging) and electrostatic induction.

By cyclically increasing and decreasing the mutual separation between the charge centres of the plates, so current can be induced to flow back and forth between the plates in response, thereby generating an alternating current across the load. Triboelectric generator devices thus can be considered a charge pump.

The power output can be increased by applying micron-scale patterns to the polymer sheets. The patterning effectively increases the contact area and thereby increases the effectiveness of the charge transfer.

Recently, an emerging material technology for power generation (energy harvesting) and power conversion has been developed which makes use of this effect, as disclosed in Wang, Z. L., "Triboelectric nanogenerators as new energy technology for self-powered systems and as active mechanical and chemical sensors." ACS nano 7.11 (2013): 9533-9557. Based on this effect several device configurations have been developed of so-called triboelectric nanogenerators ("TENG").

Since their first reporting in 2012, the output power density of TENGs has been greatly improved. The volume power density may reach more than 400 kilowatts per cubic metre, and an efficiency of ~60% has been demonstrated (ibid.). In addition to high output performance, TENG technology carries numerous other advantages, such as low production cost, high reliability and robustness, and low environmental impact.

The TENG may be used as an electrical power generator, i.e. energy harvesting from, for example, vibration, wind, water or random body motions or even conversion of mechanically available power into electricity. The generated voltage is a power signal.

TENGs may broadly be divided into four main operational classes one of which operates in a so called linear sliding mode, wherein charged plates are induced to slide laterally with respect to one another in order to change the area of overlap between them. A potential difference is induced across the plates, having an instantaneous magnitude in proportion to the rate of change of the total overlapping area. By repeatedly bringing plates into and out of mutual overlap with one another, an alternating current may be established across a load connected between the plates.

One particular subset of linear sliding mode TENGs which have been developed are rotational disk TENGs which can be operated in both a contact (i.e. continuous tribocharging and electrostatic induction) or a non-contact mode (i.e. only electrostatic induction after initial contact electrification). Rotational disk TENGs typically consist of at least one rotor and one stator each formed as a set of spaced circle sectors (segments). The sectors overlap and then separate as the two disks rotate relative to each other. As described above, a current may be induced between two laterally sliding—oppositely charged—layers, with a magnitude in proportion to the rate of change of the area of overlap. As each consecutively spaced sector of the rotor comes into and then out of overlap with a given stator sector, so a current is induced between the two sector plates, initially in a first direction, as the plates increase in overlap, and then in the opposite direction as the plates decrease in overlap.

The limitations of early versions of segmentally structured disk TENGs (Long Lin et al., Segmentally Structured Disk Triboelectric Nanogenerator for Harvesting Rotational Mechanical Energy, Nano Lett., 2013, 13 (6), pp 2916-2923) were that the rotational and stationary triboelectric layers require deposition of metal electrodes and connection with electrical leads, leading to inconvenient operation of the rotational part. Furthermore intimate contact is mandatory to achieve efficient electricity generation, which results in possible material wear, wear particles, instability of output, and generally limited lifetime of the TENG.

A disk TENG with both groups of patterned electrodes attached onto a stationary disk, together with a freestanding triboelectric layer on a rotational disk can resolve these issues, as disclosed in Long Lin et al., Noncontact Free-Rotating Disk Triboelectric Nanogenerator as a Sustainable Energy Harvester and Self-Powered Mechanical Sensor. ACS Appl. Mater. Interfaces, 2014, 6 (4), pp 3031-3038.

With such a structure, there is no necessity for electrode deposition or electrical connection for the rotational part, which dramatically improves the operating facility of the energy harvester.

Rotational disk TENGs, and indeed linear sliding mode TENGs in general, can be operated in both a contact mode and a non-contact mode. Although contact is desired to tribo-charge the plates (both initially and also subsequently, to counteract leakage) the electrostatic induction process itself (by means of which the electrical energy is generated) does not require contact between the plates, but operates well with a small plate separation (of, for example, approximately 0.5 mm).

Operating in a contact mode—wherein the plates are maintained in continual frictive contact—results in a higher power output, since the plates are being continually charged, and hence continually maintained at some theoretical maximal charge capacity (defined by the capacitance of the bi-plate system) by continual replacement of charge lost through leakage etc. The greater the charge which can be maintained on the plates, the greater the electrostatic inductive output which can be generated, since naturally a greater charge density induces a greater electrostatic force between electrons in the plates.

SUMMARY OF THE INVENTION

Operating a tribo-generator in contact mode brings with it various difficulties, including excess noise production and deterioration of device materials through surface abrasion.

Hence it was realised by the inventors that, ideally, the generator is operated in contact mode only intermittently, in order to replenish charge on the plates if needed, and operates the remainder of the time in non-contact mode, during which electrical energy may be generated through electrostatic induction.

In realising such a bi-mode operation, mechanisms for controlling transition between contact and non-contact mode and for controlling the gap height between plates precisely are two key challenges. Moreover, precise control of gap height is an important problem, not just for triboelectric generators but for all varieties of inductive generator, for example, since plate separation distance during the electrostatic induction process has a significant impact on the generated voltage and power output. The ability to carefully control the separation distance between plates of an inductive generator is highly advantageous, even in cases where they are not intended to be used in the bi-mode operation.

By way of illustration, FIG. 1 shows a graph illustrating a measured relationship between plate separation in mm (x-axis 10) and peak power output in mW (y-axis 12) for an example rotating plate TENG comprising a PTFE rotor. As discussed above, power output is greatest when the plates are in contact (i.e. zero plate separation), reaching a peak output for the example rotor measured for FIG. 1 of approximately 0.5 mW. As plate separation is increased, peak power output falls extremely sharply, with a separation of just 0.5 mm incurring a near 80% output reduction, peak power falling to just 0.1 mW. For a particular rotating disk TENG device type, at a separation of 2 mm, power output has fallen to almost zero.

Similarly, FIG. 2 illustrates the relationship, for the same example TENG, between plate separation in mm (x-axis 16) and peak-to-peak amplitude of the output voltage in V (y-axis 18). Once again, a sharp decline is observed in response to increased plate separation, with a gap of 0.5 mm incurring a reduction in peak-to-peak voltage of approximately 75% (from ~140V to ~35V).

This strong relationship between plate separation distance and peak power output holds not just for the example TENG generators represented by the graphs of FIGS. 1 and 2, but for all varieties of electrical generator which generate power according to similar principles of electrostatic induction. Hence it is desirable to be able to control the plate gap distance to a high degree of precision, not only in order to stably manage transitions between contact and non-contact modes of bi-mode operation TENGs, but also to efficiently manage, control or regulate power and/or voltage output of inductive generators—including TENGs—more generally.

In addition, it is desirable, for easy incorporation of such generators into small consumer electronic devices, that mechanisms for controlling plate separation be as compact, efficient and simple as possible—ideally not requiring heavy or complicated mechatronic actuation elements.

Desired therefore are electrical generator systems comprising mutually rotating charged elements for generating electrical power, which further comprise simple, compact and efficient drive mechanisms for precisely controlling a separation distance between said mutually rotating elements and which do so without adding significant bulk, weight or operational complication to the device.

The invention aims to provide ways to address the aforementioned problem with a device and method as defined in the independent claims. The dependent claims provide advantageous embodiments of variations.

Thus, according to the invention, there is provided a system in comprising:

an electrical power generator for generating electrical power, the power generator comprising:

a first element and a second element at least one of which is configured for comprising an electrical charge, the first and second element being further configured to be rotatable with respect to each other in order to thereby generate the electrical power when at least one of the first element and second element comprises the electrical charge, wherein the system further comprises:

a mechanism configured for controlling a distance between the first element and the second element such that the distance is controlled in dependence on a relative speed of rotation between the first element and the second element.

Hence embodiments of the invention provide a mutually rotating charged plate generator having an associated driving mechanism for precisely controlling plate separation. Controlling a distance between the elements may comprise inducing or generating a separation between the elements, maintaining a given separation between the elements, and/or varying a separation extent between the elements. The distance between the first and second elements controlled by the mechanism is a separation distance along a direction parallel with the axis of mutual rotation of the elements. In cases, for example, where the elements comprise planar rotating elements, having planar surfaces which face one another, the controlled distance is a distance along a direction parallel with one or both of the surface normal directions.

The elements may, according to certain examples, comprise circular disk elements, for instance, such as the circular disk plates of a rotating disk triboelectric generator, or circular disk plates of a non-triboelectric inductive generator, or circular disk plates of a non-inductive generator. According to other examples, however the elements may comprise generator plates of a different shape, or may not comprise planar plate-like elements at all and references to 'disks' or 'plates' in descriptions which follow, in respect of the generator elements, is not to be considered limiting with regards those, or any other, embodiments.

Since the separation distance is controlled in dependence on the relative speed of rotation of the elements, embodiments provide a simple, intrinsic mechanism for controlling and regulating plate separation, wherein the speed of the plates itself provides the control parameter for varying the height of the gap between the spinning elements.

According to certain examples, the rotating elements themselves may be provided having intrinsic features or properties which naturally generate a separating force, such as a lift force, between the elements in response to rotation. In this way, the rotation of the elements itself may naturally provide a (solid or fluid) bearing by means of which the elements may be supported in a separated state. Moreover, said bearing provides a separation between the elements of a magnitude in proportion to the speed of rotation of the elements, thereby providing a simple and intrinsic mechanism for precisely controlling the extent of separation of the elements.

Furthermore, certain embodiments of the invention may allow for a generator which is at least partially self-regulating with regard to managing the separation distance between the mutually rotating elements (rotor-stator separation distance). This arises is in virtue of the fact that the separation distance between the elements is controlled in dependence on an intrinsic operational parameter of the generator itself (i.e. the relative rotation speed). Depending upon how the rotation speed of the generator is itself controlled and regulated, the self-regulation of the separation distance may operate according to any of a number of possible schemes.

By way of just one non-limiting example, the rotation speed of the plates may for instance be controlled so as to be in proportion to the output voltage of the generator. In this particular case, should the output voltage begin to decline, so the plate separation distance would begin to narrow, and should the output voltage increase, so the separation distance would widen. This scheme of self-regulation may be advantageous for example in managing the charging and non-charging phases of a bi-mode TENG of the sort described above.

While embodiments allow for a generator to be operated in a self-regulating mode, this is not essential. Embodiments of the invention may, for example, provide a generator which is manually regulated with regard the element separation, by manually controlling the speed of relative rotation between the elements.

The driving mechanism may in some cases be integrated into the plate (i.e. element) structure itself, providing precise control over plate separation without the need for any external mechatronics to actuate the movement of the plates, hence avoiding the added bulk, expense and operational complication which such systems and elements may typically incur.

For example, according to one or more embodiments, a planar surface of at least one of the first element and the second element may comprise grooves for generating a hydrodynamic force between the first element and the second element in response to the relative speed of rotation. The pattern formed by the grooves is such that upon rotation of the elements relative to one another within a fluid, a pumping action in the fluid is generated such that elements are pushed apart with the magnitude of the force being related to the relative speed of rotation. If the elements are, for example, subject to some small pre-load force pushing the elements towards each other, then an increase in the speed of rotation will result in a proportional (or otherwise related) increase in the separation between the elements. A subsequent slowing of the elements results in a consequent narrowing of the spacing between the plates.

The grooves may for example curve inwardly toward a centre of rotation of the first and second elements, for example to form a spiral pattern. There is hence provided by these embodiments a generator comprising an integrated spiral groove thrust bearing (SGB): a self-generating bearing whose own rotation builds up the hydrodynamic pressure (lift) necessary to support the plates of the generator in a separated state.

The grooves may have a cross-sectional area which increases as a function of radial distance as measured from the centre of rotation. The inward curvature of the grooves means that upon rotation, for example gas is forced inward leading to a consequent rise in hydrodynamic pressure. This pressure generates a force upon the surface of the opposing plate, hence providing a lift force between the two plates.

According to one or more alternative embodiments, the first element or the second element may comprise two or more radially extending grooves, each of which having a depth which decreases as a function of radial distance as measured from the centre of rotation between the first and the second element. Within these embodiments, there may further be provided at least one radially mobile mass element positioned within each radially extending groove.

As the plate is rotated, so the radially mobile mass elements will be forced radially outwards in response, due to the exertion upon them by the system of centrifugal force. Since the grooves have depth which narrows toward the extremities, so the mass elements will act to push the plates apart as they move outwards. Moreover, since the grooves narrow continuously between the centre of the plate and its edge, so a greater rate of rotation will lead to a greater degree of plate separation, as the mass elements are forced ever further out by the increasing centrifugal force.

This arrangement hence provides a mass centrifugal regulator integrated within the structure of the elements, which acts to induce a separation between the elements of a magnitude in proportion to the rate of rotation.

In accordance with any of the above described embodiments, the provided grooves may at least partially delimit triboelectrically active material portions of the planar surface of the respective element. As discussed above, rotating disk triboelectric generators generate power through the successive overlap and then separation of spaced regions of triboelectric material. According to certain examples of the present invention, the grooves may be utilised to provide a natural spacing between adjacent area portions of triboelectrically active material.

In certain examples of the invention, a planar surface of at least one of the first element and the second element may comprise first and second annular regions, and wherein the first annular region comprises a pattern of grooves, and the second annular region comprises a plurality of triboelectrically active surface regions. According to these examples, the element(s) provide a plate suitable for use within a triboelectric generator, and wherein a pattern of grooves is provided on a separate region of the plate to that used for energy generation. For example, spaced (partial) sectors of triboelectric material may be formed around an outer ring of a disk-shaped element for instance, while a central region of said disk is dedicated to grooves (and in some cases mass elements) for generating lift.

According to another set of embodiments of the invention, at least one of the elements comprises radially spaced rotor blade elements. In particular, the rotor blades may comprise, for example, propeller blades or wing-shaped (aerofoil) blades. In these cases, lift is generated in response to rotation due to a pressure difference produced between the top and bottom surfaces of airfoil shaped blades. The blades may in certain examples for instance comprise one or more layers of triboelectric material, such that rotation of the blade over an opposing disk element, also comprising triboelectric material regions—spaced in congruence with the spacing of the rotor blades—produces the familiar electrostatic effect of standard rotating disk TENGs.

According to a further aspect of the invention, there is provided a method, comprising:

providing an electrical power generator for generating electrical power, the power generator comprising:
  a first element and a second element at least one of which comprising an electrical charge, the first and second element being further configured to be rotatable with respect to each other in order to thereby generate the electrical power when at least one of the first element and second element comprises the electrical charge;
  rotating the first element and the second element with respect to each other; and
  controlling a distance between the first element and the second element by controlling a relative speed of rotation between the first element and the second element.

As explained above, the intrinsic dependency of the separation distance upon the rotational speed, so that the former is controlled by varying the latter, allows for a partially self-regulating mode of generator operation with regards said separation distance, wherein the 'internal' parameters of the generator itself provide the basis for the regulation scheme.

According to just one exemplary implementation of this, rotating the first element and the second element comprises rotating at a relative speed of rotation which is a function of the output voltage of the electrical power generator. Such a method may be advantageous, for example, in managing the charging and non-charging phases of a bi-mode TENG of the sort described in the preceding section.

Embodiments of the invention also allow for a 'manual' regulation of the element separation, through manually controlling the relative speed of rotation between the elements. With regards, again, to the particular example of rotating disk triboelectric generators, manual control of the rotation speed may also be advantageously employed in managing a charging level of one or both plates.

According to certain examples for instance, the relative speed of rotation may be controlled so as to periodically transition the first element and the second element between a charging phase, during which the elements are in mutual contact, and a power generating phase, during which the elements are not in mutual contact. Hence, here, two relatively steady modes may be alternated between, with the integrated driver mechanism utilised to transfer between the two.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
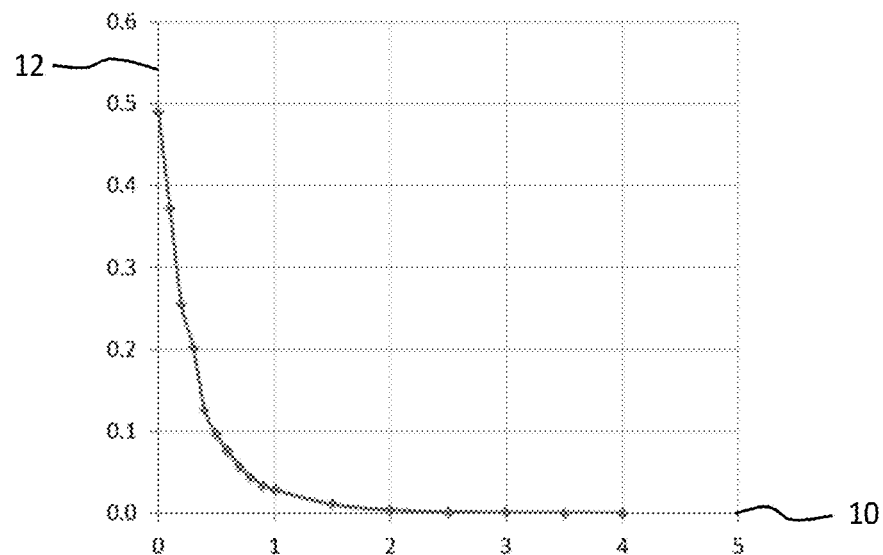
FIG. 1 shows a graph illustrating the relationship between peak power output and plate separation for an example rotating disk triboelectric generator.
Figure 2:
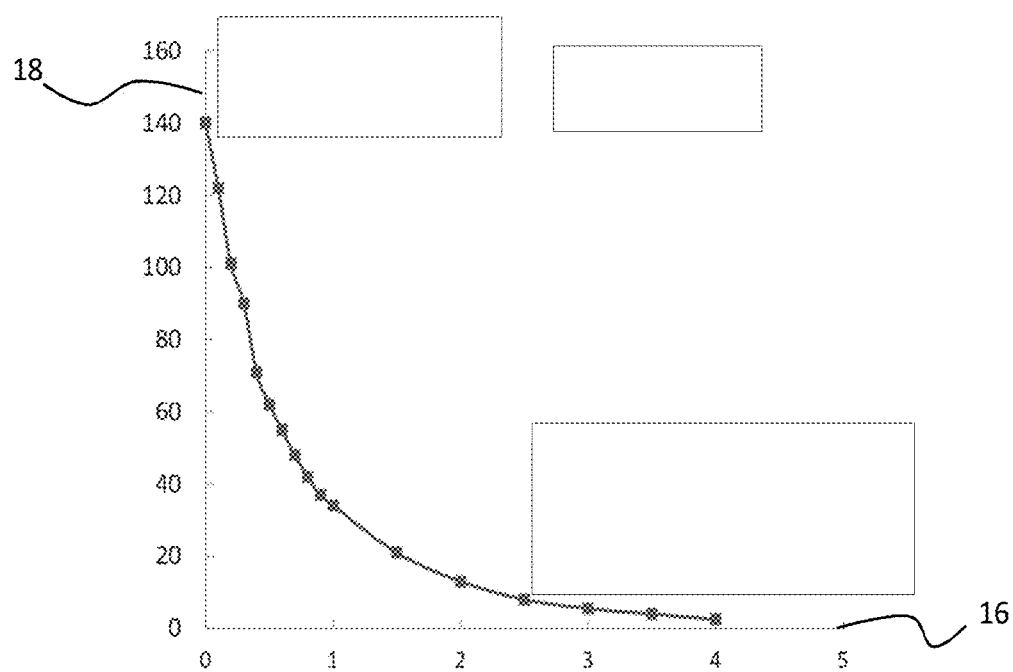
FIG. 2 shows a graph illustrating the relationship between peak-to-peak output voltage and plate separation for an example rotating disk triboelectric generator.

The invention provides an energy generation system comprising a generator having mutually charged, mutually rotating plate elements, and comprising an integrated drive mechanism for precisely controlling a separation distance between the plates. The drive mechanism provides a separation which varies as a function of the speed of rotation, hence assimilating separation control within the natural operation of the device. Embodiments provide plates comprising self-generating bearings, both hydrodynamic fluid (liquid or gas) bearings and centrifugal regulator solid bearings, the bearings providing a supporting force between the plates of a magnitude which increases as the rotational speed of the plates increases. Embodiments allow for a self-regulating TENG with regards management of rotor-stator separation and the charge level of the plates wherein drive speed of plate rotation is linked with the output voltage of the generator. Methods of triboelectric generation are also provided.

As explained above, the invention relates broadly to any system comprising an electrical power generator which operates through the mutual rotation of two or more mutually charged elements, the elements requiring or benefiting from a variable relative separation. One particular class of generator to which the invention may advantageously be applied are triboelectric generators, in particular rotating disk triboelectric generators, which as explained above, may benefit from a rotor-stator gap which is precisely adjustable, both for efficient management of generator power and/or voltage output and (in some, but not all, cases) for effective and stable implementation of transitions between contact and non-contact modes of operation. By way of illustration of the concept of the invention, various embodiments are outlined below in which detailed examples of implementation of the invention within TENG devices and systems in particular are described. In each case, however, the application to TENG generators and systems is to be understood as purely exemplary, and not limiting of the overall scope of the invention, since numerous other advantageous application exist. By way of just one class of examples, inductive generators, which generate power through electrostatic induction, but do not operate through tribo-charging of the mutually rotating plates, may utilise embodiments of the invention to effectively manage power or voltage output, for instance. The invention may be applied to other examples of generator, in particular to any which operate through the mutual rotating of mutually charged elements.

According to a first simple group of embodiments, the rotating elements themselves may be provided having intrinsic features or properties which naturally generate a separating force, such as a lift force, between the elements in response to rotation. In this way, a drive mechanism is provided which is integrated into the structure of the rotating plates themselves, their rotation naturally providing a (solid or fluid) bearing by means of which the elements may be supported in a separated state.

In particular, there exist various possible examples of so-called self-generating thrust bearings, which provide relatively low-friction bearing support between mutually rotating loads. The rotating of the bearing itself generates the required supporting force to keep the plates separated, and the extent of separation can be precisely controlled, through controlling the speed of the bearing rotation.

By way of a first example, there may be provided, by one or more embodiments of the present invention, a rotating disk generator, such as a rotating disk TENG, having rotating disk elements, one or more of which comprises a pattern of curved, interleaving grooves for the purpose of generating perpendicular hydrodynamic lift in response to rotation. There is hence provided by these examples a TENG or other generator having incorporated into one or more of its disk elements a so-called spiral groove thrust bearing (SGB).

Spiral groove thrust bearings are self-acting, 'contactless' fluid bearings whose own rotation (within a lubricating fluid) builds up the pressure necessary to support the plates of the generator in a separated state. The bearings generate the required pressure to maintain the plate surfaces separated through a so-called 'wedging and pumping' action: the spiral pattern is such that when the parts of the bearings are rotated with respect to each other the spiral pattern of the grooves and ridges push the lubricating fluid towards the centre of the patterned bearing surface causing an overall rise in the pressure. This rise in pressure at sufficient rotation speeds, exert a force against the opposing surface of the bearing, pushing the two apart.

In such bearing systems, the bearing surfaces make contact during starting and stopping of rotation but there is a gap between the surfaces during rotation, wherein the gap size depends upon the bearing design, rotation speed, viscosity of the fluid medium—and bearing load. Starting from contact, rotation causes hydrodynamic lift with air or other fluid as load-carrying medium. The gap induced between the plates may be very small, so that electrostatic coupling between electrodes on the opposing plates is large enough to produce significant power output during device operation (non-contact) mode.

The magnitude of the generated hydrodynamic force is related to the speed of rotation, so that faster rotating plates induce a greater magnitude of force. The plates may be subjected to some (small) inward pre-load force (or bias), for example, such that increases and decreases in plate speed—and hence lift force—result in stable increases and decreases in plate separation. In this case, the motion of the generator plates itself directly drives the inward and outward adjustment of plate separation.

Such contactless air bearings allow for very precise control over the rotor-stator gap height, and hence may be used to enable careful regulation of the generator output voltage, avoiding any large swings in output, for example. Furthermore, this type of bearing greatly reduces surface friction forces, which also greatly reduces potential noise production, hence allowing for the use of a rotating disk TENG, for example, within products or applications without the requirement for special noise protection systems or architecture. Moreover, the 'self-acting' nature of the bearing (wherein the hydrodynamic pressure is generated through the rotation of the bearing itself) means that the benefits of a contactless fluid bearing may be provided without the use of more traditional pressurised gas or liquid solutions—which incur added bulk due to pump/vacuum elements etc.

Although such bearings are commonly termed 'spiral groove' bearings, a wide variety of possible specific patternings in fact exist which may be used to generate the hydrodynamic effect, including, but not limited to, herringbone and v-groove patterns.

Figure 3:
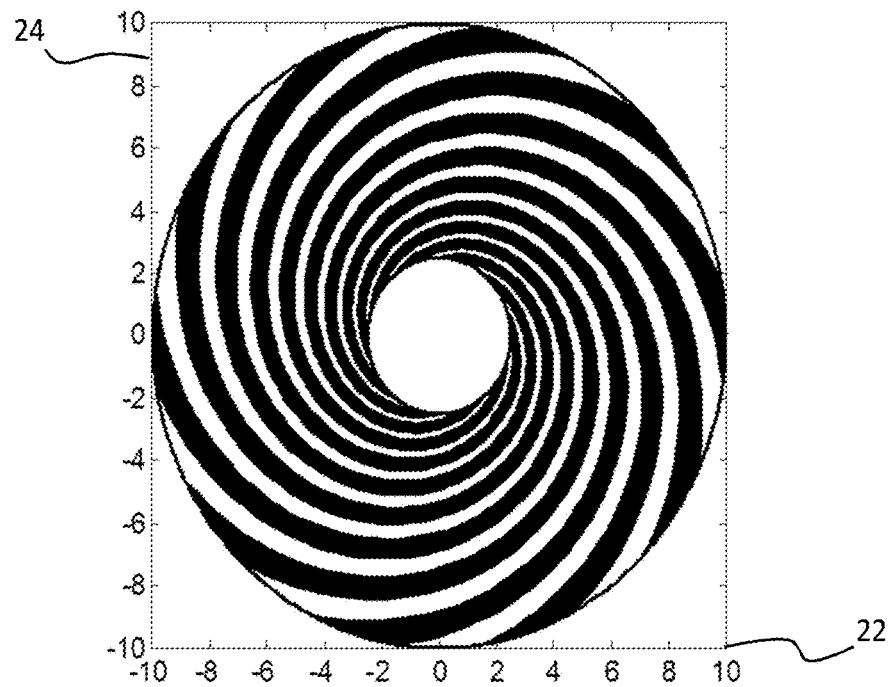
FIG. 3 shows a first example groove patterning for a spiral groove thrust bearing.

A small sample of such patterns is shown, by way of illustration, in FIGS. 3-6. FIG. 3 shows an example of a standard spiral patterning which may be implemented in a generator to provide a self-generating fluid bearing function, wherein the x (22) and y (24) axes represent the width and length dimensions of the pattern (in mm). In this example (FIG. 3), the pattern is shown as applied to a circular disk element, such as a disk element which may be comprised for example by a rotating disk TENG. The grooves curve inwardly toward the central aperture of the disk, through which fluid is drawn or expelled at the beginning or end of the 'pumping' process. The grooves narrow as they curve inwardly toward the centre. Upon rotation (in a clockwise direction in FIG. 3) fluid is forced inward along the grooves, from a wider outer region, to a narrower inner region, leading to a consequent rise in hydrodynamic pressure. This pressure exerts a force upon the surface of the opposing plate, hence providing a lift force between the two plates.

Figure 4:
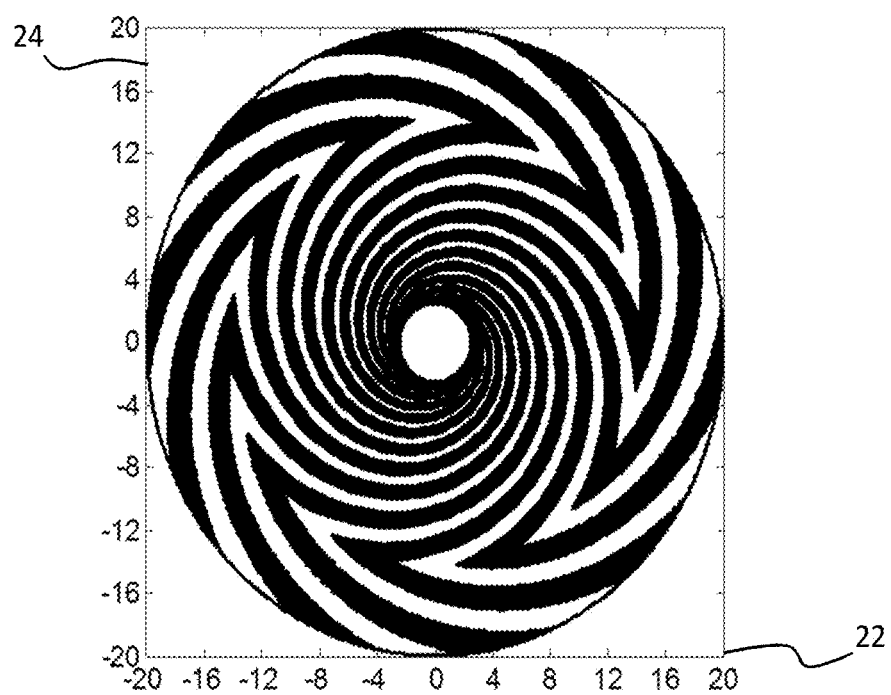
FIG. 4 shows a second example groove patterning for a spiral groove thrust bearing.

A slight variation of this pattern is shown in FIG. 4 (with, again, x (22) and y (24) axes representing the width and length dimension of the pattern in mm), wherein the pattern comprises a 'spiral herringbone' arrangement, with an outer region of the carrying disk comprising a circulating pattern of interleaved 'V'-shaped grooves, each having a tail which subsequently spirals inwards toward the centre of the disk. Again, the grooves narrow as they approach more central regions of the disk. According to this design, a secondary ring of 'convergence points' is provided by the apexes of the V-shapes, wherein upon rotation (in an anti-clockwise direction), a fluid wedge is built up from both prongs of the V, causing an elevation in pressure at the meeting point, and a consequent perpendicular lift force.

Figure 5:
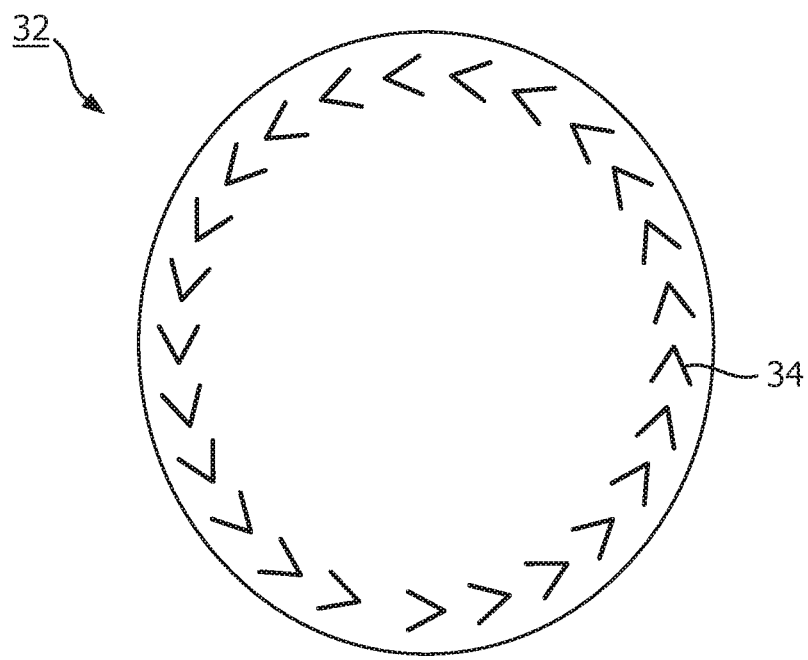
FIG. 5 shows a third example groove patterning for a spiral groove thrust bearing.

FIG. 5 shows an alternative pattern arrangement, wherein a circular series of V-shapes 34 is formed around an outer rim of a rotating disk element 32. Similarly to the 'herringbone' Vs of the example of FIG. 4, rotation of the disk (in a clockwise direction) induces a build-up of fluid at the apexes of the Vs, as air is forced from both 'prongs' into the central meeting point. This causes a build of pressure, which is expelled perpendicularly to the surface of the disk, producing a force by means of which the two opposing disk elements may be held apart from one another.

Figure 6:
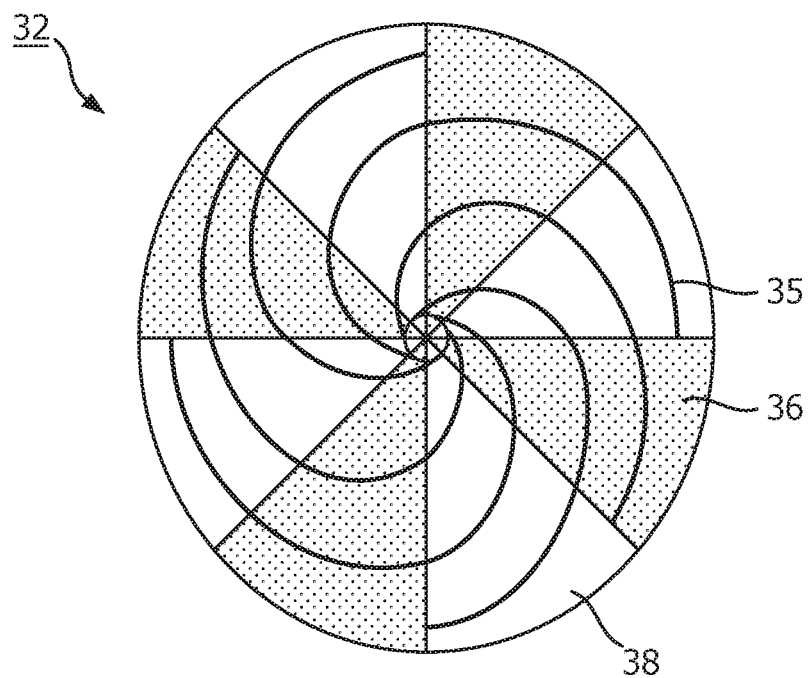
FIG. 6 shows a first example of a rotating disk element comprising a spiral groove patterning.

In FIG. 6 is shown a sketch of a possible implementation of an example spiral groove pattern within a rotating disk element 32 of a triboelectric generator. A spiral of interleaving grooves 35 is formed into the planar surface of the rotating disk element 32, spanning across a pattern of alternating first 36 and second 38 material regions. According to some examples, alternating first 36 and second 38 material regions may comprise alternating triboelectrically active and triboelectrically inactive material regions. According to other examples, first and second regions might both comprise triboelectrically active materials, so as to form a pattern of, for example electrically isolated, metal electrodes. The metal electrodes may each comprise the same triboelectrically active material, for example, or rotational sectors 36 and 38 may comprise differing triboelectrically active materials. The grooves may be formed on the rotor disk element of the triboelectric generator or on the stator disk element.

By way of non-limiting example, the groove pattern (according to any example embodiment) may be formed in the surface of the disk element through imprinting, (for example by lasering or etching) into a metallised acrylic layer. This may be performed in concert with the imprinting of rotational sectors 36,38, for example. Alternatively, the grooves may be pre-moulded into the acrylic in advance of metallisation. Alternative methods for forming the patterns may also be used, as will be understood by the skilled person.

Figure 7:
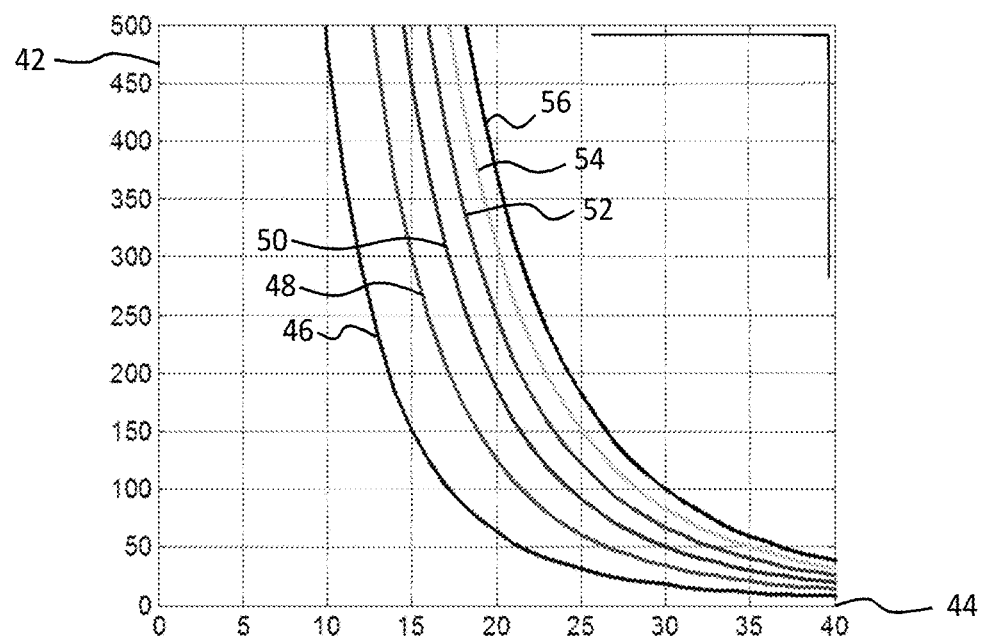
FIG. 7 shows a graph illustrating the load-bearing capacity as a function of plate separation, at a variety of rotation speeds, of a first example spiral groove bearing.
Figure 8:
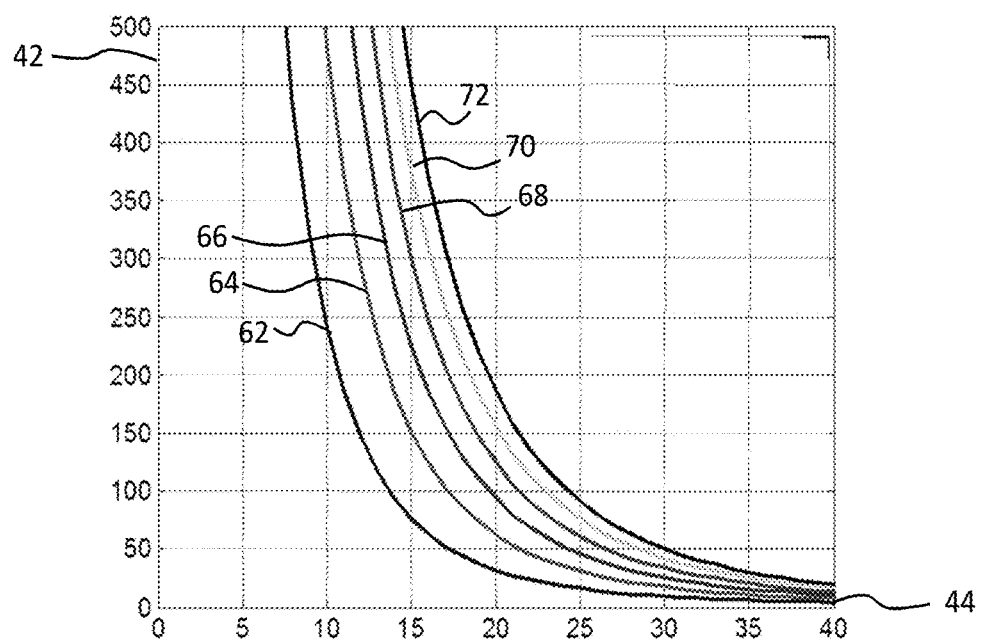
FIG. 8 shows a graph illustrating the load-bearing capacity as a function of plate separation, at a variety of rotation speeds, of a second example spiral groove bearing.

The load carrying capacity of thrust bearings depend upon various properties of the grooves themselves, the size and pitch of the spiral, as well as the fluid properties (e.g. viscosity) of the load-carrying medium. In FIGS. 7 and 8 are shown graphs illustrating the load-bearing capacity 42 (in mN) as a function of plate separation 44 (in µm), at a variety of rotation speeds for the two example spiral bearing patterns of FIGS. 3 and 4 respectively. For both examples, the bearings were provided to disks having an inner radius of 2.5 mm and an outer radius of 20 mm.

FIG. 7 shows the load-bearing capacity 42 (in mN) as a function of plate separation 44 (in µm) for plates comprising the spiral bearing pattern of FIG. 3, being operated in air having dynamic viscosity of 18.3 µPa·s. The particular bearing tested comprised a pattern of 30 grooves, each having a depth of 15 µm, and a groove angle α of ±15° and a ridge width to groove-ridge ratio of 1.

In FIG. 7, the six curves 46-56 show the load carrying capacities of the plates corresponding to incrementally increasing plate rotation speed. Curve 46 corresponds to an angular frequency of 500 rpm, curve 48 to a frequency of 1000 rpm, curve 50 to 1500 rpm, curve 52 to 2000 rpm, curve 54 to 2500 rpm and curve 56 to 3000 rpm. At 3000 rpm and a load of 375 mN, a rotor-stator separation (i.e. aerodynamic lift) of 20 µm can be expected. For the same load, at 500 rpm, a separation of 12 µm is to be expected.

FIG. 8 shows the load-bearing capacity 42 (in mN) as a function of plate separation 44 (in µm) for plates comprising the herringbone-spiral pattern bearing of FIG. 4, being operated in air having, again, a dynamic viscosity of 18.3 µPa·s. The bearing tested comprised a pattern of 30 grooves, each having a depth of 15 µm, and a groove angle α of ±15° and a ridge width to groove width ratio of 1. The circular arrangement of herringbone V apexes has a radius of 14.25 mm.

In FIG. 8, the six curves 62-72 correspond to the same progression of plate rotation speeds as the curves 46-56 of the previous graph. In particular, curve 62 corresponds to an angular frequency of 500 rpm, curve 64 to 1000 rpm, curve 66 to 1500 rpm, curve 68 to 2000 rpm, curve 70 to 2500 rpm and curve 72 to 3000 rpm. Compared to the spiral bearing pattern of FIG. 3, the load carrying capacity of the herringbone bearing is roughly half as large, for a given separation distance and rotational velocity. To obtain at rotational speed of 3000 rpm, an aerodynamic lift 44 of 20 µm, the load should not exceed approximately 180 mN.

Figure 9:
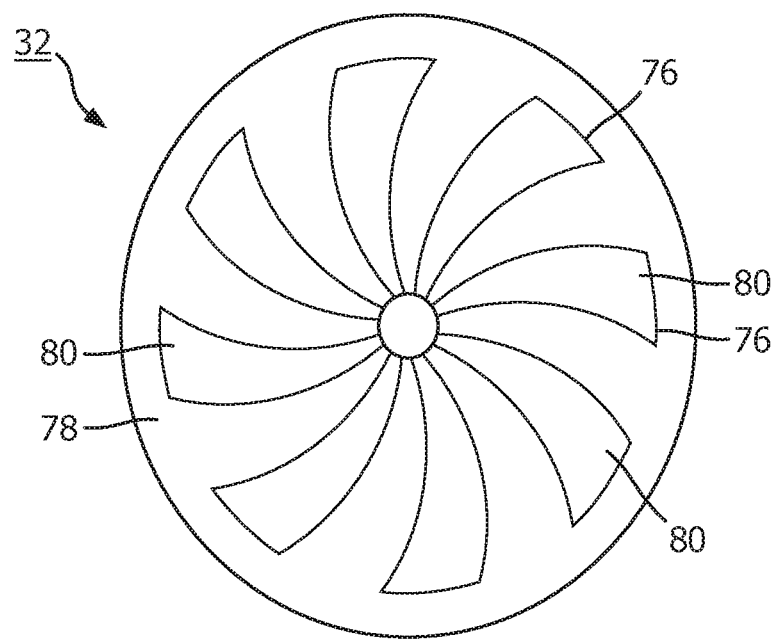
FIG. 9 shows a second example of a rotating disk element comprising a spiral groove patterning.

According to some examples, the grooves forming the spiral thrust bearing may in addition be used to provide delimitation between neighbouring triboelectric segments on the surface of disk elements to be implemented within triboelectric generators (FIG. 9). As discussed above, a rotating disk TENG operates through the successive tribo-charging, overlap and then separation of spaced regions of triboelectric material (segments) formed on the surfaces of opposing disks. Hence, in some examples, the grooves facilitating the hydrodynamic pump action of the bearing (primary function) may be advantageously utilised for the secondary function of providing a natural spacing between adjacent triboelectric material surface portions (isolation trenches of electrode array pattern). In these cases, unlike the example of FIG. 6, the grooves are effectively integrated into the triboelectric patterning of a TENG disk itself. The drive mechanism for facilitating plate separation control, and the required electrode configuration (pick-up electrode array) for generating triboelectric energy are thus amalgamated within a single, simple disk element structure.

FIG. 9 shows one example of a TENG rotating disk element 32 in which spiral or herringbone grooves form isolation lines (or trenches) 76, which thereby divide the disk into an array pattern of two alternating electrode portions: a first (continuous) triboelectric material portion 78, having arrayed within it a series of sequentially spaced isolated triboelectric material portions 80. The isolated regions act in the same way as isolation lines between the alternating circle segments of more typical rotating disk TENG designs—such as that illustrated in FIG. 6.

Figure 10:
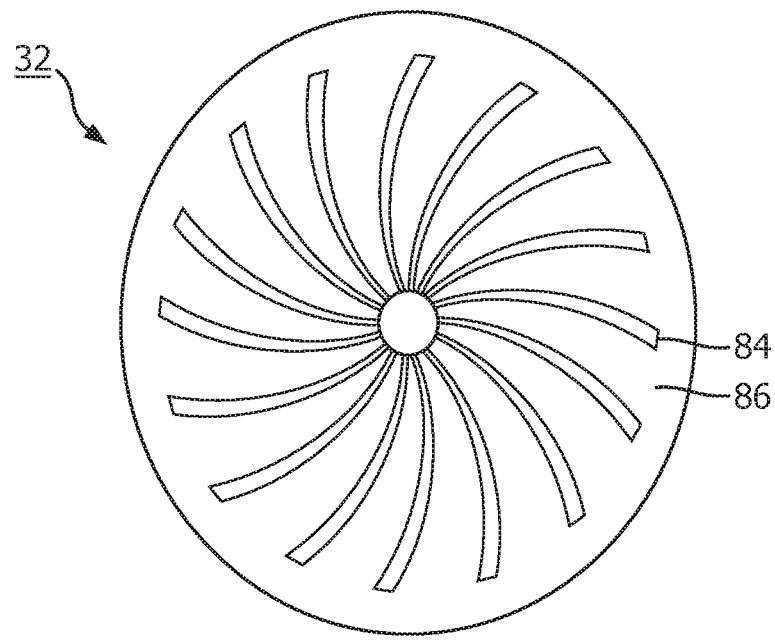
FIG. 10 shows a third example of a rotating disk element comprising a spiral groove patterning.

FIG. 10 illustrates a second example rotating disk element 32 comprising spiral grooves 86 which perform a secondary role as part of the electrical generation mechanism of the disk. In this case, the herringbone pattern 84 itself forms one of the two alternating electrodes, with the second formed by the spiral grooves 86. In this case the grooves of the herringbone pattern 84 do not merely isolate differing electrode regions, but rather comprise one of the sets of the regions themselves.

According to alternative examples (FIGS. 11 and 12), the spiral groove bearing is provided on a separate region of the TENG disk element to the triboelectrically active electrode portions: the electrical elements and the plate separation driving elements are deliberately separated from one another.

Figure 11:
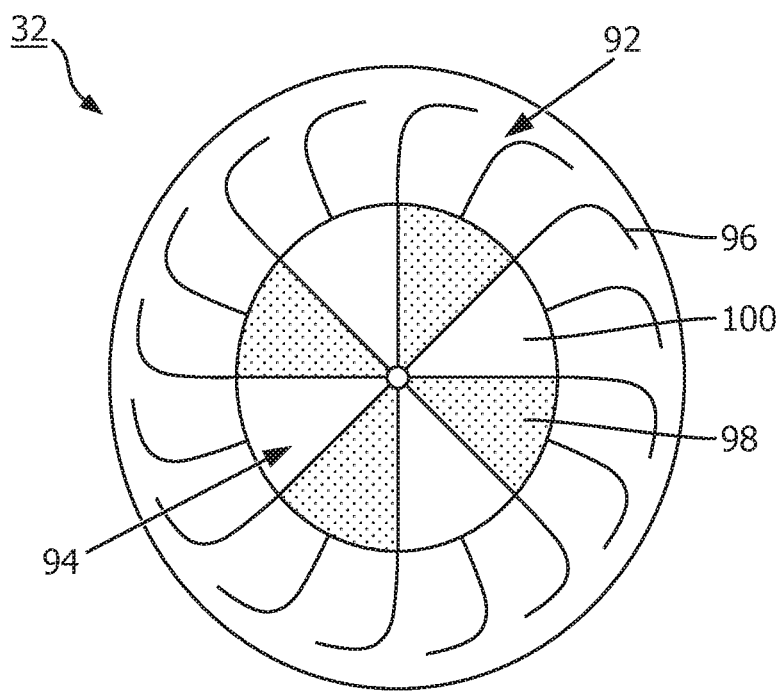
FIG. 11 shows a third example of a rotating disk element comprising a spiral groove patterning.

FIG. 11 illustrates one example of such an arrangement. According to this example, rotating disk element 32 comprises an outer annular region 92 and an inner region 94. A circularly arranged array of inwardly curving grooves 96 is formed around the outer annular region 92, which end at the periphery of inner region 94. The inner region comprises an alternating pattern of first 98 and second 100 material regions. According to some examples, the rotating disk element 32 may comprise the rotor element of a rotating disk TENG, in which case the pattern of first and second material regions may comprise a pattern of spaced triboelectrically active circle sectors 98, separated by buffer regions 100. According to other examples, the rotating disk element 32 may comprise the stator disk element of a rotating disk TENG, in which case alternating material regions may comprise simply a circularly arranged pattern of (for example electrically isolated) triboelectrically active electrodes. In some cases, triboelectrically active circle sectors 98 and buffer regions 100 may comprise the same triboelectrically active material, but in other cases may comprise different triboelectrically active materials. In each of these cases, the corresponding (opposing) disk element may comprises a similar arrangement, having an inner region formed by spaced electrode sectors or spaced triboelectric material sectors, and an outer region comprising either a complementary spiral bearing pattern, or simply a planar surface against which the pattern of disk 32 may exert hydrodynamic force in order to generate lift between the plates.

Figure 12:
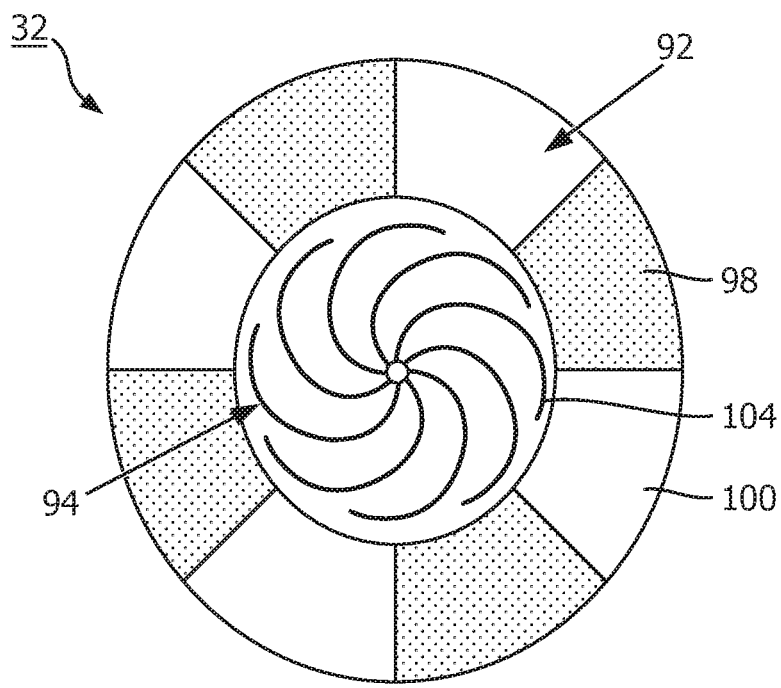
FIG. 12 shows a fourth example of a rotating disk element comprising a spiral groove patterning.

FIG. 12 illustrates a similar example arrangement, but wherein the inner region 94 comprises a spiral groove pattern 104, and the outer annular region 92 comprises spaced first 98 and second 100 material regions. As above, in the case that the rotating disk element 32 comprises the rotor disk of a TENG device, these regions may comprise a pattern of spaced triboelectrically active circle sectors 98, separated by buffer regions 100. In the case that the disk element comprises the stator disk element of a TENG device, these regions may instead comprise a circularly arranged pattern of (for example electrically isolated) triboelectrically active electrodes. The opposing disk element of the TENG in each case may again be provided having a complementary pattern of triboelectric surface portions or electrodes, such that as electrode portions 102 of the outer regions of opposing disks successively pass by one another, energy is generated through electrostatic induction.

Figure 13:
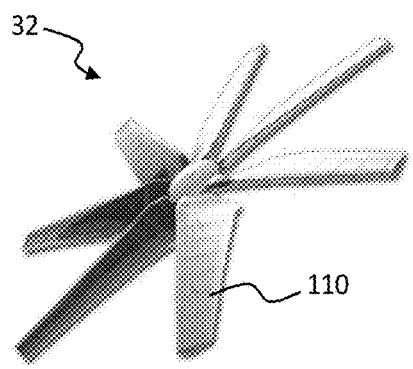
FIG. 13 illustrates an example of a rotating disk comprising radially spaced rotor blades.

The spiral groove bearing mechanisms described above represent just one set of examples of a self-acting-bearing mechanism which may be incorporated within embodiments of the invention for the purpose of controlling plate separation in rotating disk generators such as TENGs. According to a further set of examples, one or more of the disk elements may comprise a plurality of radially spaced rotor blade elements, such that, upon rotation, the disk functions in a similar manner to a propeller or rotor or turbine. FIG. 13 illustrates an example disk element in accordance with such an embodiment. In this case the structure of the rotating disk element 32 is formed entirely from the radially disposed rotor blade elements 110. Upon rotation, the radially disposed rotor blade elements blades 110 induce pressure between the stator and the rotor to induce lift. The opposing, conjugate disk element within the generator may comprise a planar disk element, thereby providing a planar surface against which the perpendicular force generated by the rotation of the propeller-shaped element 32 may act to provide the inter-plate separation force. The blades may be tilted at an angle to increase lift. The radially disposed rotor blade elements 110 may comprise one or more layers of triboelectric material, for example disposed on an 'underside' surface portion, such that rotation of the blade over an opposing disk element, the opposing disk element having triboelectric material regions spaced in congruence with the spacing of the rotor blades, produces a similar process of triboelectric power generation as in standard rotating disk TENGs.

Figure 14:
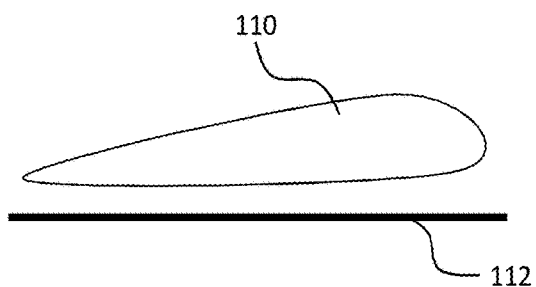
FIG. 14 shows an example of an aerofoil shaped rotor blade as may be comprised by generator rotating disks.

In particular examples, the rotor blades may comprise propeller blades, such as those illustrated in FIG. 13, or may for example comprise wing-shaped (aerofoil) blades. FIG. 14 illustrates an example aerofoil rotor blade which may be comprised by disk elements of example TENG devices. In these cases, lift is generated in response to rotation due to a pressure difference produced between top and bottom surfaces of aerofoil shaped blades. Opposing (stator) disk 112 may provide a (for example perpendicularly fixed) planar surface against which the lift force of the rotor may act.

According to variations of these examples, an 'almost flying' effect may be achieved in embodiments through a so-called 'sledge' approach, wherein rotor blade elements are shaped in the manner of an air plane wing, a ski or water-ski, to thereby give lift as the rotational speed increases.

Note: It would be understood by a skilled person in the field that instead of any gas, any non-conductive fluid can act as a lubricant in the above proposed embodiments.

Figure 15A:
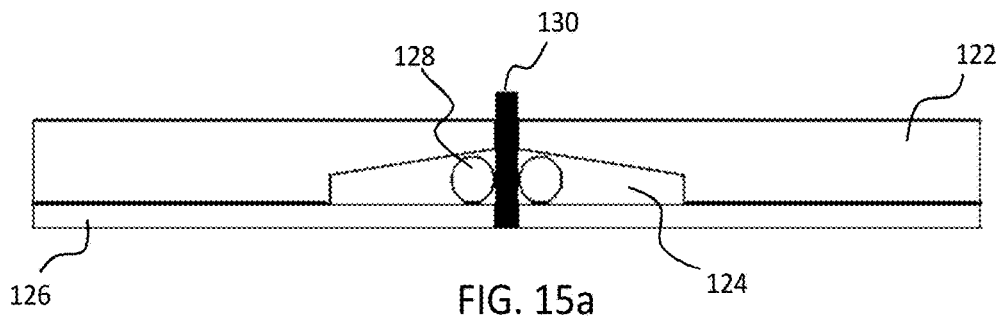
FIGS. 15a and 15b show an example of a rotating disk generator having an integrated centrifugal regulator bearing for controlling rotor-stator separation.
Figure 15B:
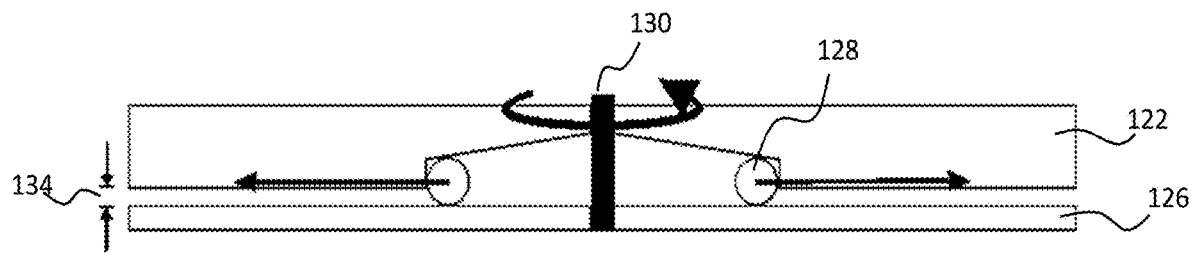

In other embodiments, a self-acting/self-regulating bearing may be incorporated into the plates of the generator which operates on the basis of solid, rather than hydrodynamic effects. FIGS. 15a and 15b illustrate one example of such an embodiment, wherein the principles of a mass-centrifugal regulator are applied to achieve flying height modifications of generator plates in response to, and of a magnitude which is a function of, rotational velocity. Rotor element 122 comprises two or more radially extending channels 124, each having a depth which linearly decreases as a function of radial distance from the centre of the disk. The grooves form channels running through the body of the rotor, bounded at their base by the planar surface of the stator 126. Disposed within each channel is a spherical mass element 128 which is free to roll along the length of the channel, and which is sandwiched between the rotor and stator such that the upper and lower wall surfaces of the channel 124 are held in continual frictional contact with points on the surface of the sphere.

As the rotor element 122 is rotated, the spherical mass elements 128 are orbitally rotated about the central rotational axle 130 relative to the surface of the stator 126, and consequently experience a centrifugal force acting upon them in a positive radial direction (i.e. outwards towards the edge of the disk). Since the spherical masses have rotational freedom along the radial extent of the channel 124, this force induces the masses to roll outwards along the channel in response. Since the channels 124 have a height which decreases linearly with radial extension, the displacement of the spheres along the channel causes the stator to be lifted upwards slightly, this perpendicular displacement being supported structurally by the rotating spheres. A greater rotational velocity induces an ever greater outward displacement of the mass elements, and hence a greater separation height 134 between the plates.

The sloping of the channels 124 naturally applies to the spherical mass elements 128 a radially inward 'restoring force', which acts to push the spheres—in the absence of countervailing radial forces—inward toward the central rotational axle 130. Hence, as the rotation of the plates slows down, and the centrifugal force exerted on the mass elements decreases in magnitude, so the countervailing inward 'restoring force' provided by the sloping roof of the channel 124 acts to displace the spherical mass element 128 back inwards by a related amount. Hence the system is completely self-restoring, with the sphere radial displacement (and hence plate separation 134) being directly related to the speed of plate rotation.

In certain variations, channels 124 may in fact comprise a continuous circular 'chamber' having a height which decreases as a function of radial extension. In this case, a plurality of spherical mass elements may be arranged in a circle within said chamber, surrounding central rotational axle 130.

Although in the example of FIGS. 15a and 15b, the provided spherical mass elements 128 are spherical, in alternative examples, the mass elements may take one of any number of shapes or forms, such as, by way of non-limiting example, oblong, oval, cylindrical, cigar-shaped etc. The mass elements, for the particular embodiment described above, must be radially mobile, which may in some cases comprise rolling and in other cases sliding, for instance.

According to a further aspect of the invention, there is provided a method of operating one or more of the above described embodiments to generate electrical power, and to control a separation distance between the plates by controlling the relative speed of rotation between them. In particular, two broad operational approaches may be possible with regards to using embodiments of the invention to regulate the separation distance between the generator plates.

According to a first approach, the drive mechanism may be utilised in controlling separation of the plates 'manually': that is, the speed of rotation of the disks is externally (to the generator) controlled, by for example one or more dedicated control circuits, or by software, in order to bring about or to maintain certain separation distances at certain times according to some (possibly) pre-determined programme or scheme.

Embodiments of the invention in this case provide a highly effective, compact and integrated mechanism for driving and maintaining a plate separation distance to a high degree of precision during operation of the generator.

However, according to a second approach, embodiments of the invention may be utilised to implement at least partial self-regulation of the separation distance between the generator elements—that is, the separation distance between the plates is regulated and controlled 'internally' according to parameters of the generator itself. A particular pre-determined scheme for controlling distance is not applied to the generator, but rather the generator is adapted such that the relative speed of rotation of the elements is varied in dependency upon one or more operational (for example) parameters of the generator itself.

There are many conceivable arrangements by which this might in particular be implemented. However, according to just one particular example, the generator may be adapted such that the speed of rotation is dependent upon the output power or voltage of the generator. Such a method may be advantageous, for example, in managing the charging and non-charging phases of a bi-mode TENG of the sort described in preceding sections. In this case, as the charge on the plates leaks away, during a non-contact phase of operation, the output voltage (or power) of the generator declines, and, in response, the speed of rotation is reduced to a related degree. As a result, the separation between the plates narrows. As the charge gets ever smaller, so the plates get ever closer, before finally making frictional contact, at which point charging of the plates is initiated. As the plates charge, output voltage rapidly rises again, and in response, the plates are (relatively) accelerated to a high speed. This increase in speed once again induces a separation between the plates, and non-contact energy generation may recommence.

The bi-mode operation of a rotating disk TENG might also be advantageously managed by one or more 'manual' modes of plate separation regulation in accordance with embodiments of the invention. For example, an external controller circuit or computer module for instance may be utilised, according to certain examples, to vary the relative rotation speed so as to periodically transition the plates between a fixed-separation charging (non-contact) phase and a generating (contact) phase. According to this example, the speed of the plate rotation does not continuously reduce in proportion to an operational parameter of the generator (such as output voltage), but rather may be held relatively constant throughout the generating phase, being reduced, for example, only once a charge state of the plates reaches a certain lower threshold. Hence two relatively steady modes are intermittently alternated between, with the integrated driver mechanism utilised to transfer between the two.

According to any embodiment of the invention, the generator may be operated according to one or more manual 'user-control' modes, wherein the separation distance is controlled in dependence upon one or more user input commands. Embodiments may allow for a generator which is 'switchable' between a self-regulating mode and one or more 'manual' modes. Embodiments may provide a TENG which is switchable between the self-regulating and the manual intermittent charging modes described above.

According to one or more of the embodiments described above, a dedicated motor may be provided for driving the rotation of the plates. In this way, the rotation speed may be directly controlled 'at source'. However, in alternative embodiments, an 'external' source of motor energy may instead be used, such as for example a wind or water turbine, as well as vibrational sources of momentum, and/or the body movements of users. In these cases, the speed of disk rotation is not controllable at source, but may be controlled through applying some intermediary resistance to the supplied rotation load so as to slow the drive speed to a desired level. The maximum speed would in this case still be determined by the motor source, but by selectively applying resistance to the mechanical output of this source, the rate of energy transfer to the generator can be controlled.

It is the relative rotation of the disks (relative to each other). Thus, the designs described above may be applied to the rotor or to the stator. It is arbitrary as to which is the rotor and which is the stator.

TENGs may broadly be divided into four main operational classes. The invention can be used in many types of TENGs.

A first mode of operation is a vertical contact-separation mode, in which two or more plates are cyclically brought into or out of contact by an applied force. This may be used in shoes, for example, where the pressure exerted by a user as they step is utilised to bring the plates into contact. One example of such a device has been described in the article "Integrated Multilayered Triboelectric Nanogenerator for Harvesting Biomechanical Energy from Human Motions" of Peng Bai et. al. in ACS Nano 2013 7(4), pp 3713-3719. Here, the device comprises a multiple layer structure formed on a zig-zag shaped substrate. The device operates based on surface charge transfer due to contact electrification. When a pressure is applied to the structure, the zig-zag shape is compressed to create contact between the different layers, and the contact is released when the pressure is released. The energy harvested might for example be used for charging of mobile portable devices.

One mode of operation is a linear sliding mode, wherein plates are induced to slide laterally with respect to one another in order to change the area of overlap between them. A potential difference is induced across the plates, having an instantaneous magnitude in proportion to the rate of change of the total overlapping area. By repeatedly bringing plates into and out of mutual overlap with one another, an alternating current may be established across a load connected between the plates.

A design which enables energy to be harvested from sliding motions is disclosed in the article "Freestanding Triboelectric-Layer-Based Nanogenerators for Harvesting Energy from a Moving Object of Human Motion in Contact and Non-Contact Modes" in Adv. Mater. 2014, 26, 2818-2824. A freestanding movable layer slides between a pair of static electrodes. The movable layer may be arranged not to make contact with the static electrodes (i.e. at small spacing above the static electrodes) or it may make sliding contact.

A third mode of operation is a single electrode mode in which one surface is for example grounded—for example, a floor road—and a load is connected between this first surface and ground (see for example Yang, Ya, et al. "Single-electrode-based sliding triboelectric nanogenerator for self-powered displacement vector sensor system." ACS nano 7.8 (2013): 7342-7351). The second surface—not electrically connected to the first—is brought into contact with the first surface and tribocharges it. As the second surface is then moved away from the first, the excess charge in the first surface is driven to ground, providing a current across the load. Hence only a single electrode (on a single layer) is used in this mode of operation to provide an output current.

A fourth mode of operation is a freestanding triboelectric layer mode, which is designed for harvesting energy from an arbitrary moving object to which no electrical connections are made. This object may be a passing car, passing train, or a shoe, for example (Again, see "Triboelectric nanogenerators as new energy technology for self-powered systems and as active mechanical and chemical sensors."ACS nano 7.11 (2013): 9533-9557).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system comprising:
an electrical power generator for generating electrical power, the electrical power generator comprising: a first element and a second element at least one of which is configured to generate an electrical charge, the first and second element being further configured to be rotated with respect to each other in order to generate electrical power when at least one of the first element and second element comprises the electrical charge, wherein the first element or the second element comprises two or more radially extending grooves, each of which having a depth which decreases as a function of radial distance measured from a center of rotation between the first and second elements; and a spherical mass element positioned within each of the two or more radially extending groove.

2. The system of claim 1, wherein the grooves at least partially delimit triboelectrically material active portions of a planar surface of the respective element.

3. The system of claim 2, wherein the planar surface comprises a first annular region and a second annular region.

4. The system of claim 3, wherein the first annular region comprises a pattern of grooves, and the second annular region comprises a plurality of triboelectrically active surface regions.

5. The system of claim 1, wherein each of the two or more radially extending grooves have a depth that linearly decreases as a function of a radial distance from a center of the first element or the second element.

6. The system of claim 1, wherein channels exist in each of the two or more radially extending grooves.

7. The system of claim 6, wherein the channels are bounded at a base by a planar surface of one of the first and second elements.

8. The system of claim 7, wherein the spherical mass element is sandwiched between the first and second elements such that an upper wall surface and a lower wall surface of the channel are held in continual frictional contact with points on the surface of the spherical mass element.

9. The system of claim 7, wherein the spherical mass element experiences a centrifugal force acting in a positive radial direction, inducing the spherical mass element to roll outwards along the channel.

10. The system of claim 6, wherein the channels have a height that decreases linearly with radial extension, causing the first element or the second element to be elevated by the spherical mass element.

11. A method, comprising
providing an electrical power generator for generating electrical power, the power generator comprising: a first element and a second element at least one of which is configured to generate an electrical charge, the first and second element being further configured to be rotatable with respect to each other in order to thereby generate the electrical power when at least one of the first element and second element comprises the electrical charge, wherein the first element or the second element comprises two or more radially extending grooves, each of which having a depth which decreases as a function of radial distance measured from the center of rotation between the first and second elements; and a radially mobile mass element positioned within each of the two or more radially extending groove.

12. The method of claim 11, wherein the grooves at least partially delimit triboelectrically material active portions of a planar surface of the respective element.

13. The method of claim 12, wherein the planar surface comprises a first annular region and a second annular region.

14. The method of claim 13, wherein the first annular region comprises a pattern of grooves, and the second annular region comprises a plurality of triboelectrically active surface regions.

15. An electrical power generator, comprising:
a first element and a second element at least one of which is configured to generate an electrical charge, the first and second element being further configured to be rotated with respect to each other in order to generate electrical power when at least one of the first element and second element comprises the electrical charge, wherein the first element or the second element comprises two or more radially extending grooves, each of which having a depth which decreases as a function of radial distance measured from a center of rotation between the first and second elements; and
a radially mobile mass element positioned within each of the two or more radially extending groove.

16. The electrical power generator of claim 15, wherein the grooves at least partially delimit triboelectrically material active portions of a planar surface of the respective element.

17. The electrical power generator of claim 16, wherein the planar surface comprises a first annular region and a second annular region.

18. The electrical power generator of claim 16, wherein the planar surface comprises a first annular region and a second annular region.

19. The electrical power generator of claim 18, wherein the first annular region comprises a pattern of grooves, and the second annular region comprises a plurality of triboelectrically active surface regions.

20. The electrical power generator of claim 15, wherein each of the two or more radially extending grooves have a depth that linearly decreases as a function of a radial distance from a center of the first element or the second element.

* * * * *